United States Patent [19]

Sugiyama

[11] Patent Number: 5,732,183
[45] Date of Patent: Mar. 24, 1998

[54] VIDEO DATA EDITOR

[75] Inventor: Kenji Sugiyama, Yokosuka, Japan

[73] Assignee: Victor Company of Japan, Ltd., Yokohama, Japan

[21] Appl. No.: 852,028

[22] Filed: May 6, 1997

Related U.S. Application Data

[63] Continuation of Ser. No. 505,392, Jul. 21, 1995, abandoned.

[30] Foreign Application Priority Data

Jul. 22, 1994  [JP]  Japan ..................................... 6-191780

[51] Int. Cl.[6] ........................................................ H04N 5/76
[52] U.S. Cl. ............................ 386/4; 386/33; 386/52; 386/111
[58] Field of Search .................... 386/4, 33, 52–64, 386/109, 111, 112; 360/13; 369/83

[56] References Cited

U.S. PATENT DOCUMENTS

| 5,191,436 | 3/1993 | Yonemitsu | 358/335 |
| 5,493,414 | 2/1996 | Inoue et al. | 358/335 |
| 5,497,239 | 3/1996 | Kwon | 358/335 |
| 5,500,743 | 3/1996 | Sakaegi et al. | 358/403 |

*Primary Examiner*—Tommy P. Chin
*Assistant Examiner*—Luanne P. Din
*Attorney, Agent, or Firm*—Jacobson, Price, Holman & Stern, PPLC

[57] ABSTRACT

A video data editor edits video data which has been predictive-coded between pictures. An editing controller outputs number data for specifying video data to be read from a recording medium and editing point data indicative of editing points of the video data to be read. The video the outputted number data. The read video data is decoded to obtain reproduced pictures. The reproduced pictures are coded to obtain re-coded video data. Before and after the editing points, original coded video data is switched to the re-coded video data on the basis of the editing point data. In stead of the editing point data, video processing control data indicative of types of video processing for editing can be used. With the video processing control data, when judged that the video processing is proceeding, original coded video data is switched to the re-coded video data, before, during and after the video processing.

6 Claims, 3 Drawing Sheets

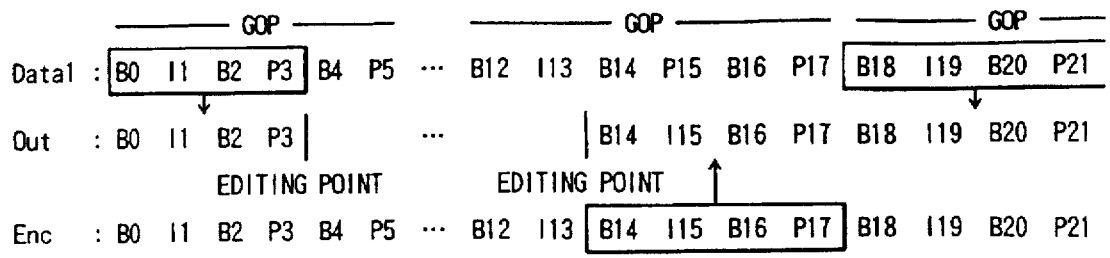
F I G. 7
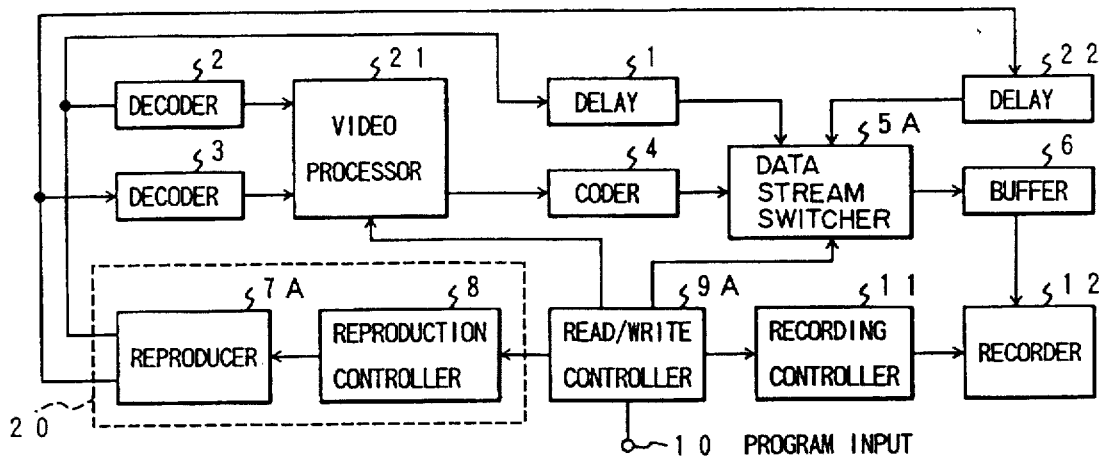
F I G. 8
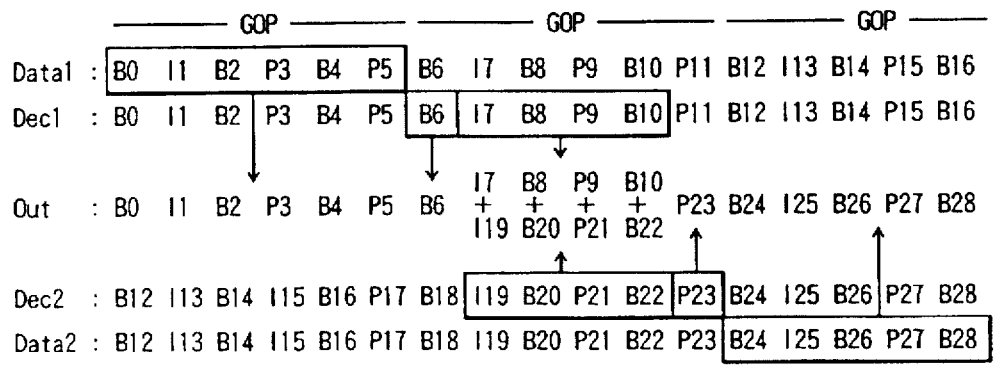
F I G. 9

VIDEO DATA EDITOR

This is a continuation of application Ser. No. 08/505,392, filed Jul. 21, 1995 which was abandoned upon the filing hereof.

BACKGROUND OF THE INVENTION

The present invention relates to a video data editor for editing video data coded at high efficiency through interframe or interfield predictive processing.

In the highly efficient coding of moving pictures, a high coding efficiency can be obtained on the basis of interframe or interfield prediction because of the high correlation between frames or between fields. In this case, since reproduced video data of frames other than the frames to be decoded are necessary in the predictive processing during decoding, it is impossible to process only the video data obtained by coding the respective frames.

Further, when the video data are edited on the basis of interframe predictive-coded video data, it is necessary to provide some video data portions at which the video data are not predicted between frames (i.e., interframe prediction is cut off). Therefore, when the interframe prediction is interrupted for each several frame periods and further video data are coded independently in each frame, it is possible to edit video data in unit of independent frame period. The period for setting the independent frames is usually determined between 2 to 15 frames, and the frames during this one-period are referred to as GOP (a group of pictures).

In the above-mentioned case, however, when there are bi-directional prediction frames (referred to as B frames, hereinafter) used in MPEG (one of the highly efficient coding methods) before and after the independent frames (referred to as I frames, hereinafter), the predictions cannot be interrupted due to the bi-directional prediction, so that the bi-directional prediction cannot be used before the independent frames.

FIG. 1 shows an example of video data editing. In FIG. 1, A, B, C, . . . denote editing units (GOPs). As shown in FIG. 1, in the editing of the video data, original video data (recorded in a recording medium), that is, some parts (C to E, I and J, M to Q) of the moving video data before editing are cut off to form a series of continuous video data (C to J). In the case where the inter-picture prediction is not made, the editing is made in unit of I frame. In the above-mentioned case, on the other hand, the editing is made in unit of GOP. However, the method is basically the same in both.

FIG. 2 shows a first basic construction example of a conventional video data editor, in which coded data are edited in unit of GOP.

In FIG. 2, video data of moving pictures recorded in a reproducing medium (not shown) as original data (before editing) are read from a reproducer 7, and thereafter the video data after having been edited are recorded in a recording medium (not shown) by a recorder 12.

In accordance with an editing program inputted through a program input terminal 10, a read/write controller 9B reads the numbers of read GOPs of moving pictures recorded in the reproducing medium in real time, and gives the read numbers to a reproduction controller 8. Further, the position numbers of GOPs (indicative of the positions at which the read data are recorded on the recording medium are given to a recording controller 11.

The reproduction controller 8 obtains the positions at which the video data corresponding to the read GOP numbers are recorded in the reproducing medium. The reproducer 7 accesses the reproducing medium in accordance with the obtained positions. In the same way, the recording controller 11 obtains the positions at which the video data are to be recorded for GOPs on the recording medium and the recorder 12 accesses the recording medium.

The discontinuity of video data read by the reproducing medium per GOP is absorbed by a buffer 6, so that continuous video data can be recorded in the recording medium. Here, the data discontinuity occurs due to changes in the read positions at the editing points.

The reproducing medium is a magnetic hard disk, magneto-optical disk, semiconductor memory, etc., in practice. Further, although the reproducing medium is used for the reproduction in the editing processing, since it is necessary to record the original video data before editing, the reproducing medium must be of the recordable type.

On the other hand, a medium the same as the reproducing medium can be used as the recording medium. However, a VTR can be also used because only continuous video data are required to be recorded.

FIG. 3 shows a second basic construction example of a conventional video data editor, by which video data are edited after coded video data have been once decoded.

The video data editor shown in FIG. 3 is different from that shown in FIG. 2 in that a decoder 2 and a coder 4 are both additionally provided. Therefore, the same reference numerals shown in FIG. 2 have been retained for the similar elements which have the same functions as with the case of the video data editor shown in FIG. 2. That is, the functions and operations of the buffer 6, the reproducer 7, the reproduction controller 8, the recording controller 11, the read/write controller 9B, the recorder 12 are the same as in FIG. 2.

The coded video data read from the reproducing medium (not shown) by the reproducer 7 are decoded by the decoder 2 into the reproduced video data, and then given to the coder 4. The coder 4 further codes the video data, and the coded video data are outputted to the buffer 6.

In this case, the inter-picture prediction is made for the video data obtained after the reproduced video data have been decoded. Although the picture quality somewhat deteriorates, the editing can be made freely.

FIG. 4 shows a construction example of the coder 4 for inter-picture prediction. In FIG. 4, video signals inputted through a video input terminal 51 are given to a video controller 58 and a video memory 52.

The frame orders of the video signals stored in the video memory 52 are changed on the basis of the control data given by the video controller 58, that is, in accordance with the picture prediction types of the independent frames (referred to as I frames, hereinafter), the unidirectional prediction frames (referred to as P frames, hereinafter), and the bi-directional prediction frames (referred to as B frames, hereinafter). The frames whose order has been changed are outputted to a prediction subtracter 53. The prediction subtracter 53 subtracts the prediction signals given by the inter-picture predictor 59 from the input video data, and the prediction residual signal (the video signals in the case of I frames) are given to a DCT (discrete cosine transform) 54. The DCT 54 processes the video signals through the discrete cosine transform, and the transformed prediction residual signals are given to an quantizer 55. The quantizer 55 quatizes the transformed video signals with appropriate step widths, and the quantized fixed length codes are given to a dequantizer 63 and a variable length coder 56, respectively.

The variable length coder 56 compresses the fixed length codes into variable length codes, and the compressed codes are outputted through a code output terminal 57.

On the other hand, the dequantizer 63 replaces the fixed length codes with representative values, and then gives the representative values to an IDCT (inverse discrete cosine transform) 62. The IDCT 62 processes the representative values through the inverse discrete cosine transform into reproduced prediction residual signals (the video signals in the case of I frames), and the reproduced prediction residual signals are given to an adder 61. The adder 61 adds the prediction signals given by the inter-picture predictor 59 to the prediction residual signals. The added and reproduced video signals are given to a video memory 60.

The video memory 60 stores video data for two frames used for the inter-picture prediction. The stored video data are outputted to the inter-picture predictor 59 as needed. The inter-picture predictor 59 forms the inter-picture prediction signals on the basis of the picture types (I, P or B) given by the video controller 58. The formed inter-picture prediction signals are given to the prediction subtracter 53 and the adder 61. In the case of the I frames, since the prediction is not made, the prediction signals are always zero.

FIG. 5 shows a construction example of a decoder which is used in correspondence to the coder shown in FIG. 4. In FIG. 5, video data inputted through a coded video data input terminal 64 are inputted to a variable length decoder 65 to return the variable length codes to the fixed length codes. The obtained fixed length codes are given to a dequantizer 63. The dequantizer 63 obtains values representative of quantization corresponding to the fixed length codes. The obtained representative values are given to an IDCT 62. The IDCT 62 executes the processing opposite to that of the DCT 54 for reproduction. The reproduced prediction residual signals (the video signals in the case of the I frames) are given to an adder 61. The adder 61 adds the inter-picture prediction signals given by the inter-picture predictor 59 to the prediction residual signals. The reproduced video signals are outputted through the video output terminal 66 and further given to a video memory 60.

On the other hand, the inter-picture predictor 59 forms the inter-picture prediction signals by use of the reproduced video data stored in the video memory 60. The formed inter-picture prediction signals are given to the adder 61.

In the above-mentioned conventional video data editor, however, when the video data coded by use of the inter-picture prediction are edited, since the independent pictures must be inserted periodically for editing and further the bi-directional prediction is interrupted immediately before the independent pictures, the coding efficiency is inevitably reduced. This problem becomes more prominent when the unit of editing is fine.

Further, when special picture processing such as wipe, fade, chromakey, DVE (digital video effect) etc., are required in addition to the simple re-connection editing, since the high-efficiency coded data cannot be processed as they are, decoding and coding are additionally required, with the result that the picture quality inevitably deteriorates.

SUMMARY OF THE INVENTION

With these problems in mind, therefore, it is the object of the present invention to provide a video data editor which can prevent the coding efficiency from being lowered due to editing, when the coded video data are required to be edited.

To achieve the above-mentioned object, the present invention provides a video data editor for editing video data predictive-coded between pictures, comprising: editing control means for outputting number data for specifying video data to be read from a recording medium and editing point data indicative of editing points of the video data to be read; reproducing means for reading the video data from the recording medium in accordance with the outputted number data; decoding means for decoding the read video data to obtain reproduced pictures; coding means for coding the reproduced pictures to obtain re-coded video data; and switching means, before and after the editing points, for switching original coded video data to the re-coded video data on the basis of the editing point data.

The coding means may code video data, on the basis of the editing point data outputted by the editing control means, without using inter-picture prediction before and after the editing points.

Further, the present invention provides a video data editor for editing video data predictive-coded between pictures, comprising: editing control means for outputting number data for specifying video data to be read from a recording medium, and video processing control data indicative of types of video processing for editing; reproducing means for reading the video data from the recording medium in accordance with the outputted number data; decoding means for decoding the read video data to obtain reproduced pictures; video processing means for video-processing the reproduced pictures in accordance with the video processing control data, to obtain processed pictures; coding means for coding the processed pictures to obtain re-coded video data; and switching means, responsive to the video processing control data, for judging that the video processing is proceeding, to switch original coded video data to the re-coded video data, before, during and after the video processing.

BRIEF DESCRIPTION OF THE DRAWINGS

FIG. 7 is an illustration showing the status where code strings are changed at the editing points;

FIG. 8 is a block diagram showing a second preferred embodiment of the video data editor according to the present invention; and FIG. 9 is an illustration showing the status where code strings are changed at the picture processing points.

DETAILED DESCRIPTION OF THE EMBODIMENTS

Figure 1:
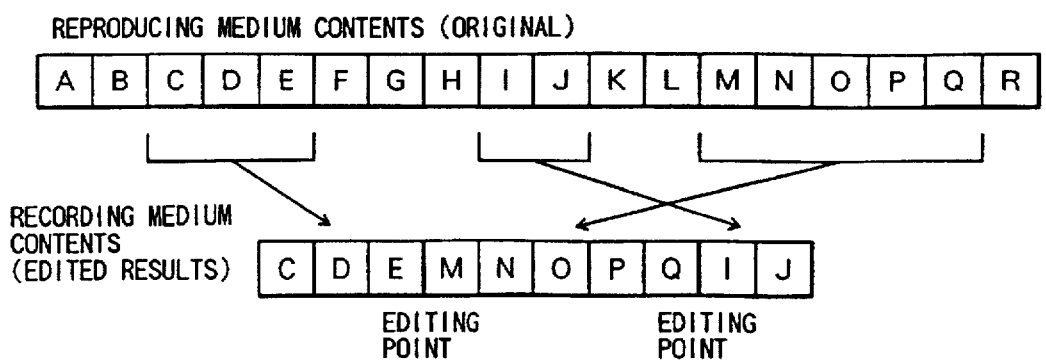
FIG 1 is an illustration showing an editing example of the picture data.
Figure 2:
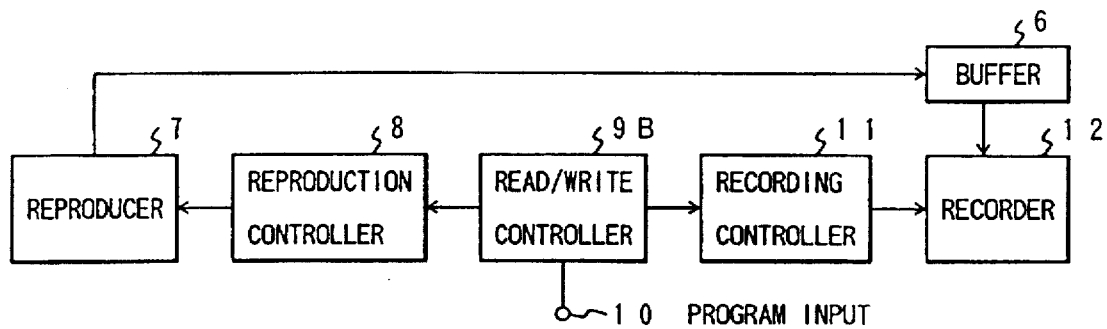
FIG. 2 is a block diagram showing a conventional video data editor.
Figure 3:
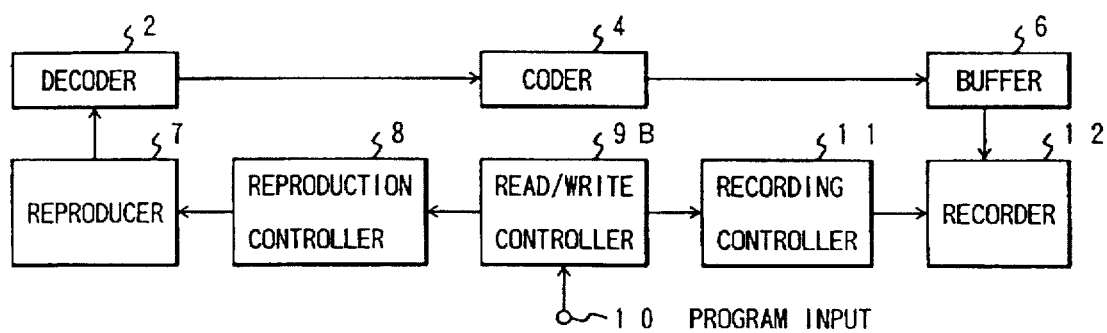
FIG. 3 is a block diagram showing another conventional video data editor.
Figure 6:
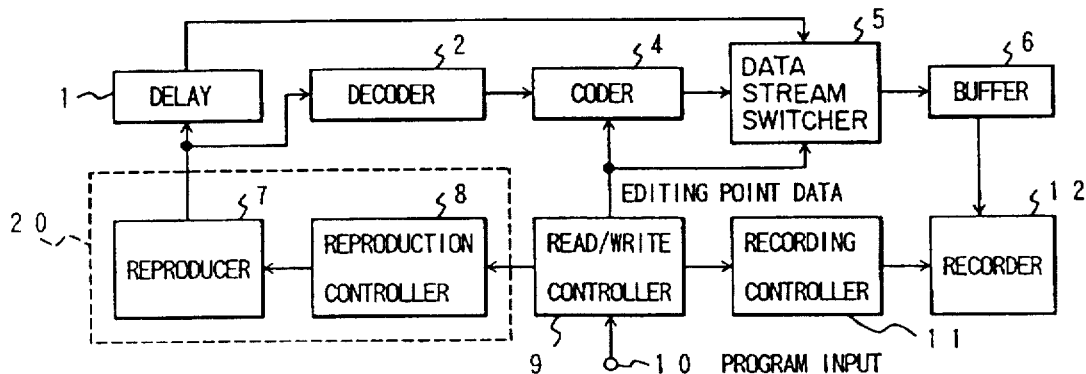
FIG. 6 is a block diagram showing a first preferred embodiment of the video data editor according to the present invention.

FIG. 6 shows a first embodiment of the video data editor related to the present invention. In FIG. 6, the same reference numerals have been retained for similar elements which have the same functions as with the case of the editor shown in FIG. 3. The video data editor shown in FIG. 6 is different from the editor shown in FIG. 3 in that a delay 1 and a data stream switcher 5 are additionally provided. Further, in FIG. 6, the functions and operations of the reproducer 7, the reproduction controller 8, the recording controller 11 and the recorder 12 are the same as with the case of the editor shown in FIG. 3.

The coded video data of GOP unit read from a reproducing medium (not shown) by the reproducer 7 are given to the delay 1 and the decoder 2. The coded video data are delayed by a time corresponding to the processing time required by the decoder 2 and the coder 4. The delayed video data are given to the data stream switcher 5.

Figure 5:
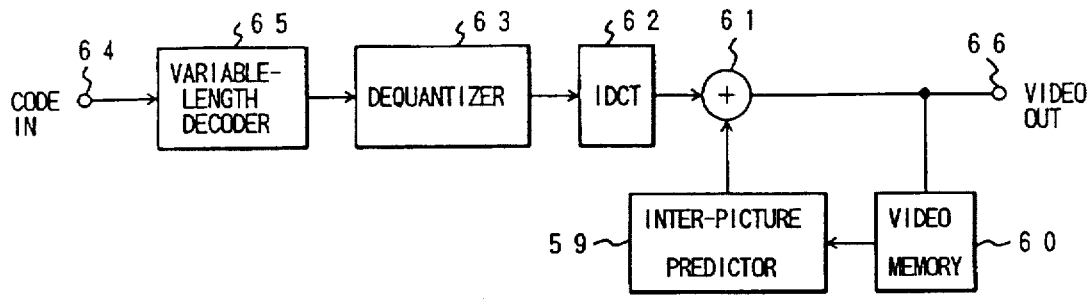
FIG. 5 is a block diagram showing a construction example of a decoder.

The decoder 2 is constructed as shown in FIG. 5, for instance. The decoder 2 decodes the coded video data in unit of GOP, and the obtained reproduced video data are given to the coder 4.

Figure 4:
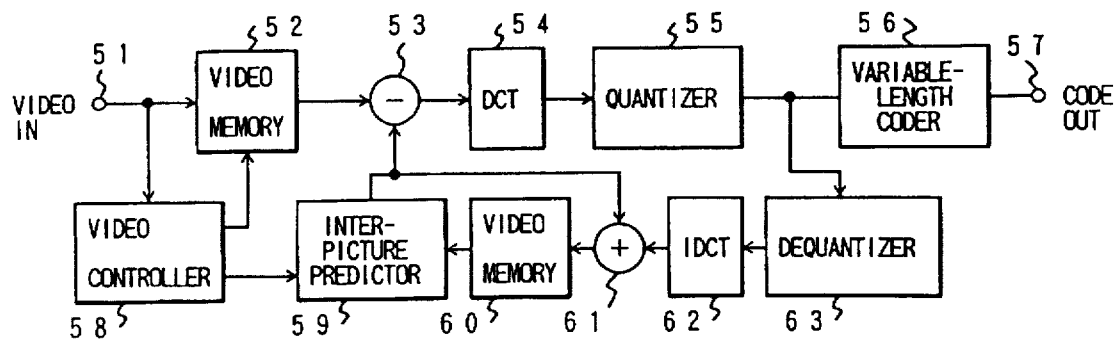
FIG. 4 is a block diagram showing a construction example of a coder.

When the editing points are determined finer than the unit of GOP, the coder 4 codes the video data in accordance with editing point data (a flag indicative of the editing point) given by the read/write controller 9 to the video controller of FIG. 4, while neglecting the inter-picture relationship between before and after the editing points. In this case, the video data are coded by changing the frame type (e.g., P frames are changed to I frames). The re-coded video date, are given to the data stream switcher 5.

In accordance with the editing point data given by the read/write controller 9, the data stream switcher 5 switches the original coded video data given by the delay 1 to re-coded video data given by the coder 4 or vice versa in synchronism with the frame numbers of the respective video data. The switched video data are given to the buffer 6.

The data stream switcher 5 selects the original coded video data in usual, but selects the re-coded video data between immediately after the editing and until the succeeding GOP. The original coded video data are switched to the re-coded video data at the editing points, and the re-coded video data are returned to the original video data when the difference between the re-coded video data and the original coded video data has been reduced.

FIG. 7 shows the status where the code strings are switched at editing points, in which B, I and P denote the types of the frames, and the suffix numerals denote the frame numbers. Further, one GOP is composed of six frames (one I frame, two P frames and three B frames). In FIG. 7, the frame numbers from 6 to 11 are omitted.

In FIG. 7, the original coded video data read from a reproducing medium (not shown) are arranged on the upper stage, along which each GOP is formed by the frames from B0 to P5, from B12 to 017, and B18 to P23, respectively.

In FIG. Y, the re-coded video data decoded by the decoder 2 and further coded by the coder 4 are arranged on the lower stage, and the video data obtained by editing are arranged on the middle stage.

FIG. 7 shows an example in which the editing points are set between two frames P3 and B4 and between two frames I13 and B14. Since the editing is made in such a way that frame B14 follows frame P3, the editing point is not synchronized with GOP. Further, since the video data are read from a reproducing medium in unit of GOP, the video data are first read from frames from B0 to P5, and then beginning from frame B12.

Further, since the coder 4 re-codes the video data again without inter-picture prediction between two frames I13 and B14, the types of frame P15 is changed to I frame I15, and frame B14 is predicted by only frame I15. Frames B14 to P17 are used as the re-coded video data, and the original coded video data are selected as frames B18 and after.

In the editing, frames B4 to I13 are omitted, so that frame B14 follows immediately frame P3. Here, frames P3 and B14 are not both the end frames of GOP. Since the data strings are read from the reproducing medium in unit of GOP, the read frames B4 and P5 are omitted from the GOP composed of frames B0 to P5, and the read frames B12 and I13 are omitted from the GOP composed of frames B12 to P17.

At the editing points, the read original coded video data are selected before the editing point (frames B0 to P3), and the re-coded video data are selected after the editing point (frames B14 to P17). The original coded video data are selected again at the succeeding GOP (frames B18 to P23).

The GOP (frames B12 to P17) immediately after the GOP containing the editing point is re-coded. When the editing point is determined after an I frame, since the I frame (e.g., I13) is omitted, the P frame immediately after the editing point is changed to the I frame for re-cording. For instance, P frame P15 is changed to the I frame (I15). Further, since frame I13 is omitted, the inter-frame prediction of B frame B14 is made on the basis of only I frame I15.

The following second embodiment of the video data editor according to the present invention is suitable for the picture processing, when special picture processing such as wipe, fade, chromakey, DVE (digital video effect) etc., are required, in addition to simple re-connection editing.

FIG. 8 shows a second embodiment of the video data editor according to the present invention. In FIG. 8, the same reference numerals have been retained for similar elements which have the same functions as with the case of the first embodiment shown in FIG. 6. The video data editor shown in FIG. 8 is different from the first embodiment shown in FIG. 6 mainly in that a decoder 3, a video processor 21 and another delay 22 are additionally provided. Further, in FIG. 8, the functions and operations of the delay 1, the buffer 6, the recording controller 11 and the recorder 12 are the same as with the case of the first embodiment shown in FIG. 6.

Two coded video data are read from a reproducing medium (not shown) at the same time by a reproducer 7A. The first coded video data are given to the decoder 2 and the delay 1, and the second coded video data are given to the decoder 3 and the delay 22. The delay 1 delays the coded video data by a total processing time required by the decoder 2, the video processor 21 and the coder 4. Further, the delay 22 delays the coded video data by a total processing time required by the decoder 3, the video processor 21 and the coder 4. Both the delayed video data are given to a data stream switcher 5A.

The decoders 2 and 3 are constructed as shown in FIG. 5, each of which decodes the coded video data. The obtained reproduced pictures are given to the video processor 21.

A read/write controller 9A gives video processing control data (indicative of how to process the video data) to the video processor 21. In accordance with the video processing control data, the video processor 21 processes (e.g., switching, mixing, etc.) the respective reproduced pictures. The processed results are given to the coder 4 as a single picture. Here, the switching and mixing are processed by use of wipe, fade, chromekey, etc. In this case, it is also preferable to execute video processing such as DVE (digital video effect) etc.

The coder 4 executes the coding processing (already described in reference to FIG. 4) for the processed pictures. The re-coded video data are given to the data stream switcher 5A. The data stream switcher 5A switches and selects one of the first original coded video data given by the delay 1, the second original coded video data given by the delay 22, and the recorded video data given by the coder 4 with frame synchronization. The switched video data are outputted to the buffer 6.

The video data are switched in accordance with the video processing control data given by the read/write controller 9A. In the GOP in which video data are switched or processed, the re-coded video data are selected. In other GOPs, the original coded video data are selected.

FIG. 9 shows the status in which the code strings are switched at the video processing points. In FIG. 9, B, I and P denote types of the frames, and the suffix number denotes a frame number.

In the example shown in FIG. 9, a first picture is switched to a second picture by wipe or fade. Before the editing point, the first original video data are selected and outputted. In the GOP in which the picture is switched, the re-coded video data are selected. In the succeeding GOP, the second original coded video data are selected and outputted.

In FIG. 9, Data denotes the first original coded video data read from a recording medium, each GOP of Data1 is composed of frames B0 to P5, B6 to P11, B12 to P17, and B18 to P23, respectively. Data2 denotes the second original coded video data read from the recording medium, each GOP of Data2 is composed of frames B12 to P17, B18 to P23, and B24 to P29, respectively.

Further, Dec1 and Dec2 denote video data decoded by the decoders 2 and 3, respectively. Further, Out denotes the video data obtained after editing.

In the example shown in FIG. 9, the data1 are switched to data2 or vice versa by offsetting 12 frames from each other. In this case, frames I7 to B10 of the data1 and frames I19 to B22 of the data2 are fade-changed, so that the video data are switched by adding the reproduced video data.

In FIG. 9, before the fade change, frames B0 to P5 of the data1 are selected. In the GOP (frames B6 to P11) to be fade-changed, the reproduced picture is selected. Further, in the fade-change portion, the reproduced picture of the frames (B18 to P23) of data2 can be used. In this case, the reproduced pictures of frame I7 of data1 and of frame I19 of data2 are added to each other.

The reproduced pictures are added by changing the mixture ratio from frame B10 of data1 to frame P22 of data2. Further, the reproduced pictures of frame B6 of data1 and frame P23 of data2 are used as they are, without addition. The GOP (the middle GOP in FIG. 9) to be fade-changed is re-coded, and the original coded video data are selected as they are in the GOPs (on the right and left sides in FIG. 9) of the middle GOP.

As described above, the second embodiment of the video data editor according to the present invention can process picture signals in various ways, without simply switching or editing the pictures, which is different from the first embodiment.

As described above, in the video data editor according to the present invention, video data can be coded by use of bi-directional prediction even at the editing points. Further, in editing, since decoded video data are re-coded again only at the editing points and the video data processing portions, it is possible to prevent the coding efficiency from being lowered due to the interruption of the bi-directional prediction at the editing points.

In the bi-directional predictive codings, since the amount of codings of the video data can be reduced down to about ½ to ⅓ of that of the unidirectional predictive codings, in particular when the editing points are fine for each several frames, it is possible to improve the coding efficiency markedly.

Therefore, in the video data editor according to the present invention, it is possible to edit ordinary coded video data to which editing is not specially taken into account, so that it is unnecessary to distinguish video data to be edited from those not edited in both coding and editing. As a result, the handling of the coding apparatus and the processing of video data can be both simplified. In addition, since the editing points can be determined finely at any desired frames, the picture can be edited in a finer unit.

What is claimed is:

1. A video data editor for editing video data predictive-coded between pictures in unit of frame, comprising:

editing control means for outputting number data for specifying video data to be read from a recording medium and editing point data indicative of editing points of the video data to be read;

reproducing means for reading the video data from the recording medium in accordance with the outputted number data;

decoding means for decoding the read video data to obtain reproduced pictures;

coding means for coding the reproduced pictures from the decoding means to obtain re-coded video data; and switching means, before or after the editing points, for switching, using frame synchronization, the read video data from the reproducing means to the re-coded video data from the coding means on the basis of the editing point data.

2. The video data editor of claim 1, wherein said coding means codes video data, on the basis of the editing point data outputted by said editing control means, without using inter-picture prediction before and after the editing points.

3. The video data editor of claim 1, further comprising delaying means for delaying the read video data from the reproducing means, so that the switching means switches the delayed video data to the re-coded video data before and after the editing points.

4. A video data editor for editing video data predictive-coded between pictures in unit of frame, comprising:

editing control means for outputting number data for specifying video data to be read from a recording medium, and video processing control data indicative of types of video processing for editing;

reproducing means for reading the video data from the recording medium in accordance with the outputted number data;

decoding means for decoding the read video data to obtain reproduced pictures;

video processing means for video-processing the reproduced pictures in accordance with the video processing control data, to obtain processed pictures;

coding means for coding the processed pictures to obtain re-coded video data; and switching means, in response to the video processing control data, for judging that the video processing is proceeding, to switch using frame synchronization the read video data from the reproducing means to the re-coded video from the coding means data, before, during and after the video processing.

5. The video data editor of claim 4, further comprising delaying means for delaying the read video data from the reproducing means, so that the switching means switches the delayed video data to the re-coded video data in response to the video processing control data.

6. The video data editor of claim 4, wherein the video processing means applies a visual change to the reproduced pictures.

* * * * *